(12) United States Patent
Trotter et al.

(10) Patent No.: US 9,011,009 B2
(45) Date of Patent: Apr. 21, 2015

(54) DIRECT ACTING ENDLINK SEAL

(75) Inventors: Jason K. Trotter, Glenview, IL (US);
Dennis M. Mark, Glenview, IL (US);
Troy S. Field, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 14/112,881

(22) PCT Filed: Apr. 20, 2012

(86) PCT No.: PCT/US2012/034425
§ 371 (c)(1),
(2), (4) Date: Oct. 18, 2013

(87) PCT Pub. No.: WO2012/145610
PCT Pub. Date: Oct. 26, 2012

(65) Prior Publication Data
US 2014/0044384 A1 Feb. 13, 2014

Related U.S. Application Data

(60) Provisional application No. 61/477,818, filed on Apr. 21, 2011.

(51) Int. Cl.
*F16C 33/74* (2006.01)
*B60G 15/06* (2006.01)
*F16C 17/04* (2006.01)
*F16C 17/18* (2006.01)

(52) U.S. Cl.
CPC .............. *F16C 33/74* (2013.01); *B60G 15/067* (2013.01); *B60G 15/068* (2013.01); *B60G 2204/418* (2013.01); *F16C 17/04* (2013.01); *F16C 17/18* (2013.01)

(58) Field of Classification Search
CPC .............. B60G 15/067; B60G 15/068; B60G 2204/418; F16C 17/04; F16C 17/18; F16C 33/72; F16C 33/74; F16C 33/7816; F16C 33/7823; F16C 33/7853; F16C 33/7856; F16C 33/7873; F16C 33/7876
USPC ................. 384/130, 140, 144, 147, 422, 607; 277/353
See application file for complete search history.

(56) References Cited

U.S. PATENT DOCUMENTS

| 3,462,205 A | * | 8/1969 | Gronski et al. | 384/494 |
| 3,957,278 A | * | 5/1976 | Rabe | 277/549 |
| 4,162,110 A | * | 7/1979 | Gardella | 384/484 |
| 4,596,054 A | * | 6/1986 | MacKendrick et al. | 2/2.12 |

(Continued)

FOREIGN PATENT DOCUMENTS

| EP | 2022994 A1 | 2/2009 |
| JP | 08326758 A | 12/1996 |
| JP | 2001027227 A | 1/2001 |

OTHER PUBLICATIONS

Corresponding International Application No. PCT/US2012/034425 Written Opinion and Search Report dated Jun. 27, 2012.

*Primary Examiner* — James Pilkington

(57) ABSTRACT

A bearing seal particularly suitable for bearings in a direct acting end link of a vehicle suspension system includes a wiper seal between first and second bearing races of the bearing. The wiper seal is secured to one bearing race and extends radially outwardly toward and against the other bearing race.

16 Claims, 7 Drawing Sheets

(56) References Cited

U.S. PATENT DOCUMENTS

| | | | |
|---|---|---|---|
| 4,798,481 A * | 1/1989 | Frank | 384/477 |
| 4,969,752 A * | 11/1990 | Kubota et al. | 384/420 |
| 5,344,241 A | 9/1994 | Wells | |
| 5,807,010 A * | 9/1998 | Parker et al. | 403/61 |
| 2002/0009249 A1 * | 1/2002 | Beghnini et al. | 384/607 |
| 2006/0248681 A1 * | 11/2006 | Trotter et al. | 16/2.1 |
| 2009/0220179 A1 | 9/2009 | Kaneko et al. | |

* cited by examiner

DIRECT ACTING ENDLINK SEAL

RELATED APPLICATIONS

The present application is National Phase of PCT/US2012/034425, filed Apr. 20, 2012, and claims priority to U.S. Provisional Application Ser. No. 61/477,818, filed Apr. 21, 2011.

FIELD OF THE INVENTION

The present invention relates generally to suspension systems in automobiles, and, more particularly to end links associated with stabilizer bars, control arms and struts in automobile suspension systems, and most particularly to lubricant seal arrangements provided on the bearing assemblies thereof.

BACKGROUND OF THE INVENTION

It is known to provide automobile suspension systems with a variety of different suspension system configurations for controlling handling, comfort and performance. For example, it is known to provide vertical struts to counteract vertical deflection from bumps, body roll and the like. In some configurations the strut is attached within the overall steering system whereby the strut also rotates as the vehicle is steered. Such configurations are known as "steerable strut suspensions".

Stabilizer bars are known in many configurations for vehicle suspension systems and may be connected to the suspension system in various ways. When connected to the strut to act directly against the strut the system is commonly referred to as a "direct acting" suspension system in that the stabilizer bar acts directly on the strut. When a direct acting stabilizer is provided on a steerable strut the connection is somewhat complicated in that the end link used to connect the stabilizer bar to the strut must withstand and accommodate not only vertical movement of the strut, but also rotational movement of the strut when the vehicle is steered right or left, in addition to the twisting moment provided on the stabilizer bar during operation. The link may experience significantly different articulation at opposite ends thereof, with the strut end connection experiencing primarily rotation, and the stabilizer end connection experiencing primarily angulation. Ball joint links have been used in such configurations to accommodate the multidirectional articulations and forces acting on the connections.

A ball joint link includes a rotatable ball held in an attachment which accommodates rotational movement of the connecting end, normally at right angles to the link stud itself. Ball joint links require lubrication, which is held in place by ball joint boots. The boot, which is required for sealing, retains grease in the ball joint structure. However, boots are sometimes easily worn, cut or cracked, and can allow the ingress of contaminants and thereafter trap the contaminants when present in the joint. Ball joint link boots have proven to be components of frequent and regular service or repair. Further, due to the rotational nature of the end of a ball joint link, assembly and installation have been difficult in that the fastened end must be driven into place, and rotation of the end makes it difficult to hold in proper position. Further, ball joint links have been susceptible to corrosion due to wear, and when worn or corroded tend to fail or operate poorly, resulting in noise or other problems.

Conventional grommet end links are also known for use in linear attachments, such as between a stabilizer bar and a control arm. Such end links can be simple in nature with linear threaded components at either end. However, simple linear end links can not be used in many installations of direct acting suspensions on steerable struts due to the rotational movement at the connecting joint.

Accordingly, a grommet end link suitable for direct acting suspension systems having steerable struts has been proposed. The end link includes grommets on opposite sides of a suspension pad and bearing assemblies adjacent each grommet. One side of each bearing assembly is connected to rotate with the grommets and suspension pad, and the other side of each bearing assembly is connected to move with the rod of the end link. Connection via the end link enables the stabilizer system to reduce body roll during vehicle cornering by transmitting force from the stabilizer bar to the suspension. A direct acting end link decouples the rotation experienced at the link during steering while providing a better leverage ratio by connecting to the strut. The improved leverage allows for a smaller diameter bar for reduced mass while providing similar body roll reduction. In such a link, it is necessary to maintain adequate lubrication along bearing surfaces and packed within the bearing to prevent or substantially block the ingress of water or other contaminants into the bearing area. This will reduce wear caused by contaminants getting between the contact surfaces of the bearing as the surfaces rotate with respect to each other repeatedly during operation and use. Wear can cause increased torque, stick, slip or noise as the surfaces become rougher. Further, wear can result in the loss of lubrication. This can potentially cause the link to become less effective and increase grommet wear as the bearing no longer rotates as it should. Without proper bearing lubrication, the grommets can be abraded by the suspension pads, increasing wear and reducing durability.

A labyrinth seal can be used to retain grease in the bearing, and will provide minimal drag and therefore low bearing torque in that, when packed with grease, a labyrinth seal has minimal contact surface areas. Bearing torque is considered to be the rotational torque about the central axis of the bearing assembly. In general, drag created from friction at contact areas and additional areas further out on the diameter of the bearing assembly will increase bearing rotational torque. However, a labyrinth seal does not provide a positive contact seal, and contaminants can follow along an ingress path defined by the labyrinth seal from outside the seal to the inner volume of the bearing assembly. The winding path of a labyrinth seal provides only a passive seal even when fully packed with grease. Further, the non-contacting ribs of a labyrinth seal can allow some side to side movement during normal operation in a multi-directional rotating connection as necessary when used in direct acting suspensions systems having steerable struts. Side to side movement of the bearing components is undesirable in that it can lead to increased wear.

A more positive contact seal can be provided through the use of an O-ring compression type seal to establish a physical barrier; however, a compression type seal creates high bearing torque due to the increased drag of the contacting surfaces. An O-ring seal requires pre-compression to seal properly, to account for its own wear and to account for manufacturing part tolerances to ensure a positive contact seal throughout the life of the part. Pre-compression creates drag on the bearing race as a result of the amount of normal force needed to compress the O-ring. The bearing rotational torque increases since the O-ring contacts at a large radius from the axis of rotation of the bearing and also as a result of the drag force created by friction. Increased bearing torque is undesirable in a multi-directional rotational system of a direct acting end link for a steerable strut system.

Accordingly, for more effective operation of a grommet end link for direct acting suspensions systems having steerable struts it is desirable to provide a more positive seal than a labyrinth seal, but a seal having less drag than a compression O-ring seal.

SUMMARY OF THE INVENTION

A bearing is provided with a wiper seal having a main body secured to one bearing race and a flexible tail extending angularly radially outward from the main body and slidingly received against a bearing surface of the other bearing race.

In one embodiment of one form thereof, a wiper seal is provided in a bearing for a direct acting end link of a vehicle suspension system, the wiper seal including an enlarged body affixed to one bearing race and a thinner tail extending angularly outward radially from the main body and slidingly received against a bearing surface in the other race.

Other features and advantages of the invention will become apparent to those skilled in the art upon review of the following detailed description, claims and drawings in which like numerals are used to designate like features.

Figure 1:
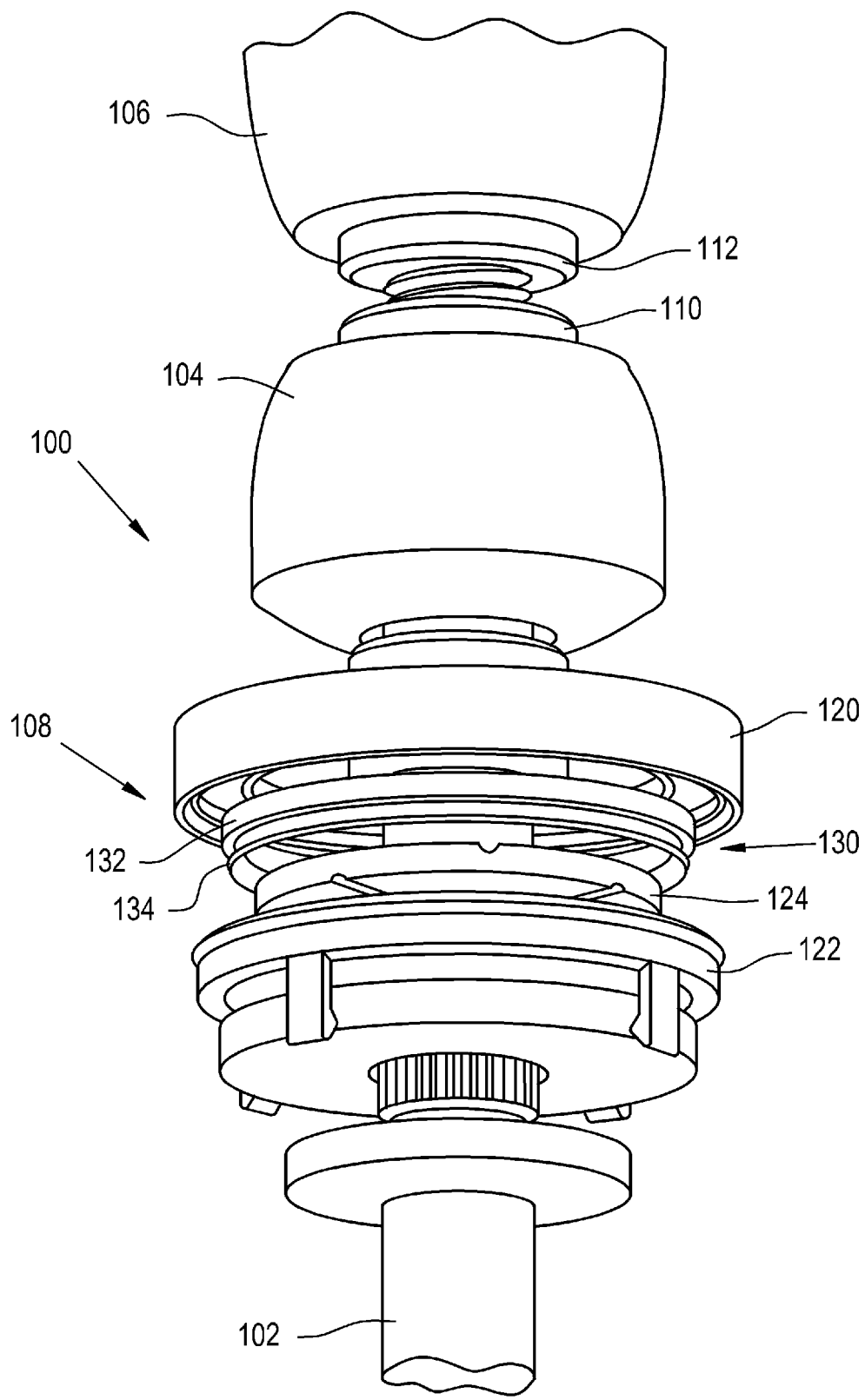
FIG. 1 is a perspective, exploded view of an end link having an end link seal.
Figure 2:
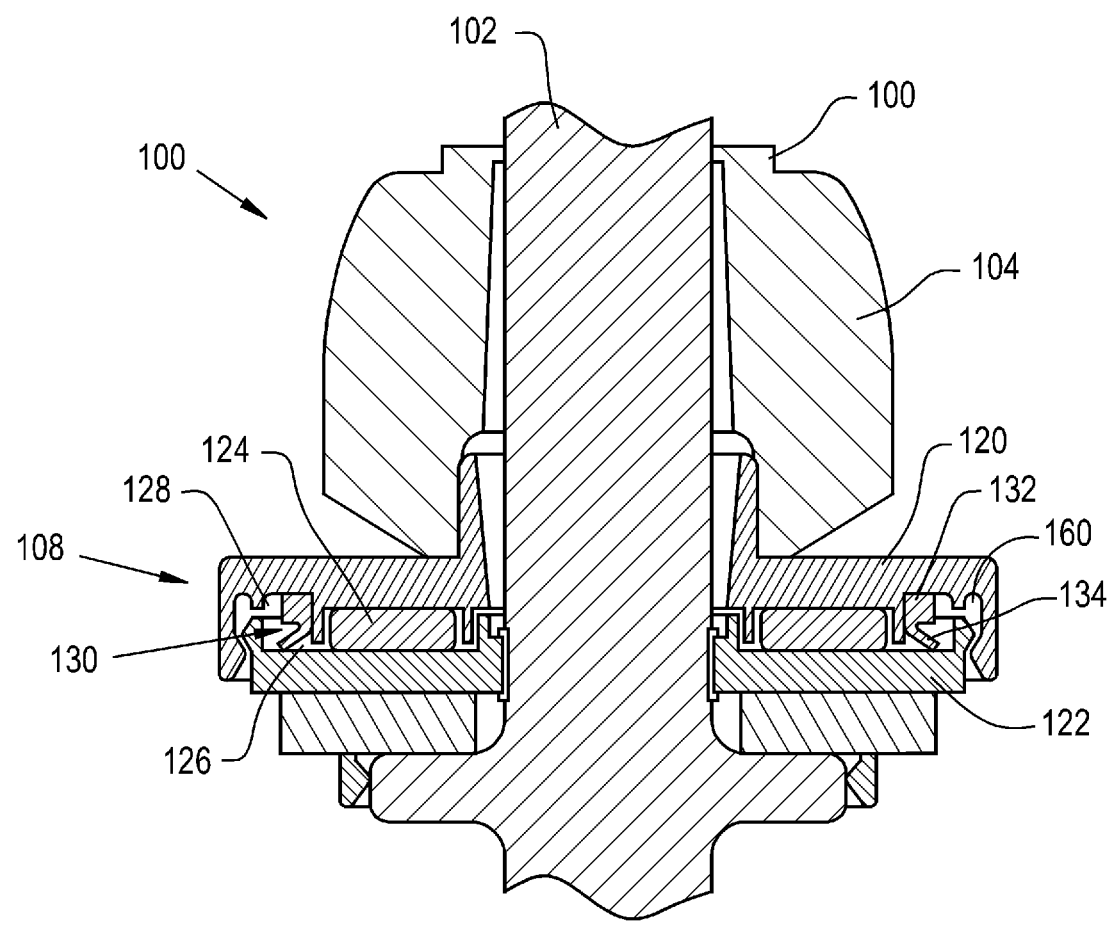
FIG. 2 is a cross-sectional view of the fully assembled end link shown in FIG. 1.
Figure 3:
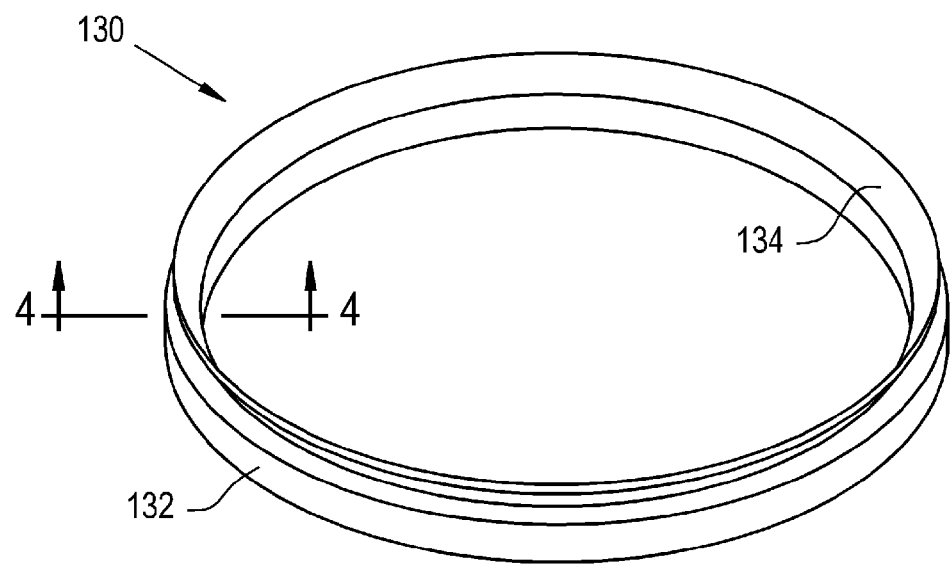
FIG. 3 is a perspective view of the seal shown in FIGS. 1 & 2.
Figure 4:
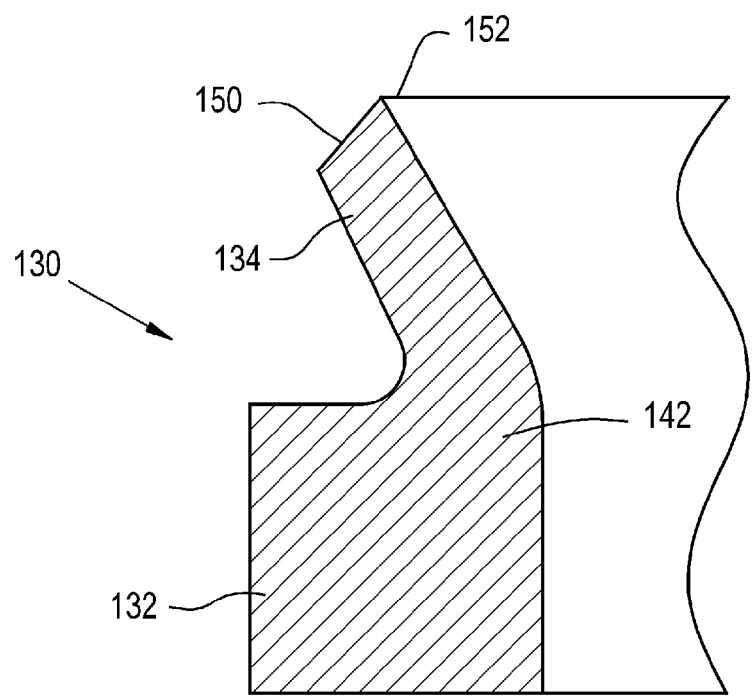
FIG. 4 is an enlarged cross-sectional view of the seal shown in FIG. 3, taken along line 4-4 of FIG. 3.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings, and to FIG. 1 in particular, and an end link 100 is shown on a link rod 102. End link 100 includes grommets 104, 106 and a bearing assembly 108 adjacent each grommet 104, 106. It should be understood that while only one bearing assembly 108 is shown adjacent grommet 104 in the fragmentary view of FIG. 1, a second bearing assembly on the opposite side of grommet 106 is included, but not shown, the second bearing assembly being similar to bearing assembly 108 to be described herein. In use of end link 100, grommets 104, 106 are installed on opposite sides of a mounting pad or other point of attachment to a strut. Grommets 104, 106 may include confronting, projecting collars 110, 112 of reduced a diameter that are received in and engage opposite sides of a through hole in a mounting pad or other point of attachment.

Bearing assembly 108 includes an upper bearing race 120, a lower bearing race 122 and a bearing disk 124. An inner open bearing volume 126 and an outer open bearing volume 128 are provided between upper bearing race 120, lower bearing race 122 and bearing disc 124. An annular lip seal 130 establishes a physical barrier extending from upper bearing race 120 to lower bearing race 122 and establishes a physical separation between inner bearing volume 126 and outer bearing volume 128. Accordingly, annular lip seal 130 establishes a barrier to the ingress of contaminants into inner bearing volume 126 from outer bearing volume 128. Inner open bearing volume 126 is filled with grease during assembly and use for lubrication of the confronting surfaces. Outer bearing volume 128 may be filled with grease also, as a deterrent to ingress of water, grit or other contaminants.

Lip seal 130 includes a main body 132 and a thinner, angular tail 134. Main body 132 is a block-like body in cross-section and is engaged against upper bearing race 120. In the embodiment shown in FIGS. 1-5, as can be seen most clearly in the enlarged cross-section of FIG. 5, block-like main body 132 resides in and against a base surface 136 of a well 138, and is supported against radial inward movement by an inner annular flange 140 of upper bearing race 120. The block-like square body structure of main body 132 provides improved rigidity for ease of handling and automation of assembly.

Tail 134 extends from an inner edge area 142 of main body 132, is thinner than main body 132, and extends from main body 132 in an angular direction that is both radially outwardly and axially away from main body 132. In an installed condition, tail 134 extends to and resides against a bearing race surface 144 of bearing race 122. The angular outward orientation of tail 134 allows grease from inner bearing volume 126 to deflect and squeeze past tail 134 if necessary, allowing the grease to flow into outer bearing volume 128, thereby minimizing the potential for grease compression in the bearing. However, tail 134 establishes a physical barrier to the ingress of contaminants into inner bearing volume 126, due to the angular orientation of tail 134. Lip seal 130, and particularly tail 134 thereof, is installed with and resides at an angle with respect to the opposing bearing race which is canted to allow sealing in one direction and not in the other. As shown, the angled tail 134 is not supported and is allowed to flex outwardly allowing grease out of the bearing race. Angled tail 134 is prevented from flexing inwardly and is supported by the bearing race surface 144, thereby providing a seal from contaminant ingress to inner bearing volume 126.

The distal end surface 150 of tail 134 is defined at an angle to establish a thin wiper edge 152 for riding against bearing race a surface 144. The thin wiper edge 152 reduces contact friction against bearing race surface 144 relative to wider flatter seal components.

While lip seal 130 is shown as a drop in, discrete part, it should be understood that it can also be provided as an overmolded component of bearing race 120. Overmolding can be provided in a two shot mold or in a two-step process whereby a previously molded race is inserted into a new mold cavity and the seal molded over the top of it or through it. The overmolded seal can be chemically bonded to compatible plastics or can be mechanically bonded to incompatible plastics by way of undercuts, tapers and/or flow channels.

FIGS. 6-10 show a second embodiment of a lip seal 230. An end link 200 is shown on a link rod 202. End link 200 includes grommets 204, 206 and a bearing assembly 208 adjacent each grommet 204, 206. It should be understood that while only one bearing assembly 208 is shown adjacent grommet 204 in the fragmentary view of FIG. 6, a second bearing assembly on the opposite side of grommet 206 is included, but not shown, the second bearing assembly being similar to bearing assembly 208 to be described herein. In use of end link 200, grommets 204, 206 are installed on opposite sides of a mounting pad or other point of attachment to a strut. Grommets 204, 206 may include confronting, projecting collars 210, 212 of reduced a diameter that are received in and engage opposite sides of a through hole in a mounting pad or other point of attachment.

Bearing assembly 208 includes an upper bearing race 220, a lower bearing race 222 and a bearing disk 224. An inner open bearing volume 226 and an outer open bearing volume 228 are provided between upper bearing race 220, lower bearing race 222 and bearing disc 224. Annular lip seal 230 establishes a physical barrier extending from upper bearing race 220 to lower bearing race 222 and establishes a physical separation between inner bearing volume 226 and outer bearing volume 228. Accordingly, annular lip seal 230 establishes a barrier to the ingress of contaminants into inner bearing volume 226 from outer bearing volume 228. Inner open bearing volume 226 is filled with grease during assembly and use for lubrication of the confronting surfaces. Outer bearing volume 228 may be filled with grease also, as a deterrent to ingress of water, grit or other contaminants.

Lip seal 230 also can be provided as a discrete drop in part, or as an overmolded component of one of the bearing races as described previously for lip seal 130. Lip seal 230 is a hoop-like structure having a thicker main body 232 and a thinner tail 234. Thicker main body 232 is held by one bearing race, upper bearing race 220 in the exemplary embodiment, in a restricted well 238 and is supported against radially inward movement by an annular flange 240. Tail 234 extends angularly outward radially and axially from main body 232 and operates against a bearing race surface 244 of the other bearing race 222. Lip seal 230 functions similarly to lip seal 130 in allowing grease to flow out of the bearing assembly while establishing a physical barrier to the ingress of contaminants.

Thicker main body 232 can be provided with a bump out or protrusion 246 to insure proper placement in a tool or fixture for consistent ejection and handling for automated assembly.

The distal end surface 250 of tail 234 is defined at an angle to establish a thin wiper edge 252 for riding against bearing race a surface 244. The thin wiper edge 252 reduces contact friction against bearing race surface 244 relative to wider flatter seal components.

Lip seals 130, 230 can be made of, for example and not limitation, flexible rubber, TPE or flexible plastics such as LDPE. Seals 130, 230 thereby provide low friction and further reduce torque beyond that resulting from lower seal compression forces. The drop in designs for seals 130, 230 provide ease and efficiency for assembly, in addition to reduced manufacturing cost. It should be understood that seals 130, 230 also can be designed for a slight interference fit against annular flanges 140, 240, with an additional sealing rib if necessary, for durability. Each can be provided as an overmolded part on one of the bearing races, further simplifying assembly.

Figure 5:
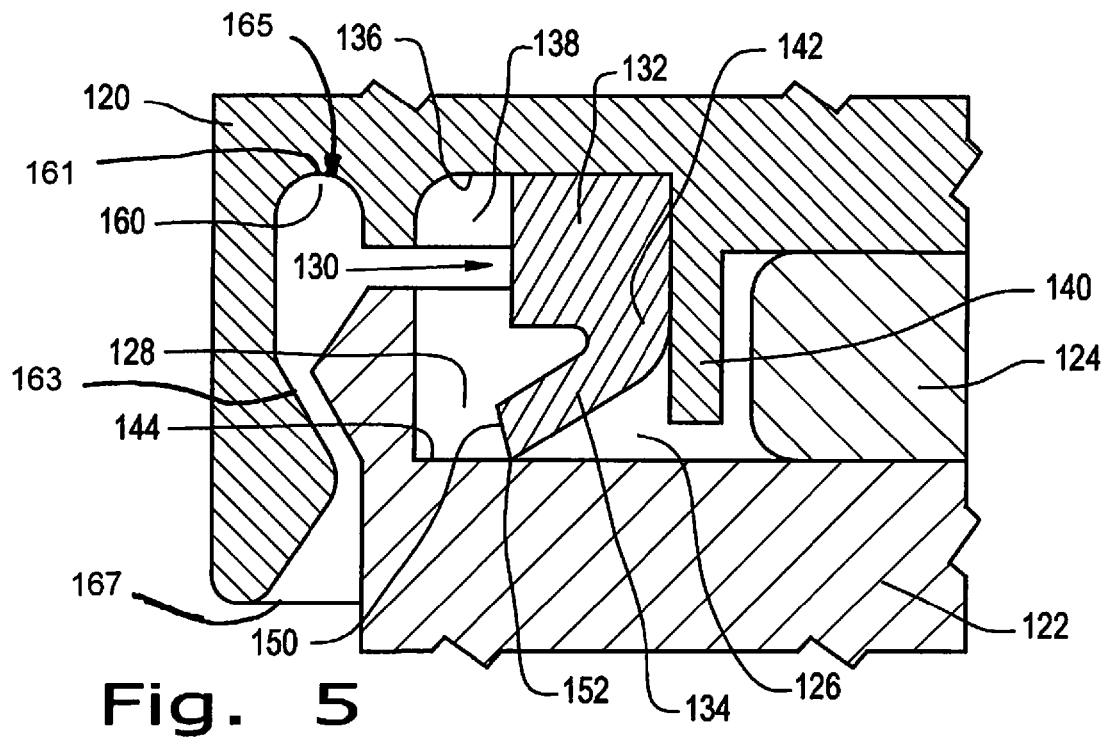
FIG. 5 is an enlarged, fragmentary cross-sectional view of the installed seal shown in FIGS. 1-4.
Figure 7:
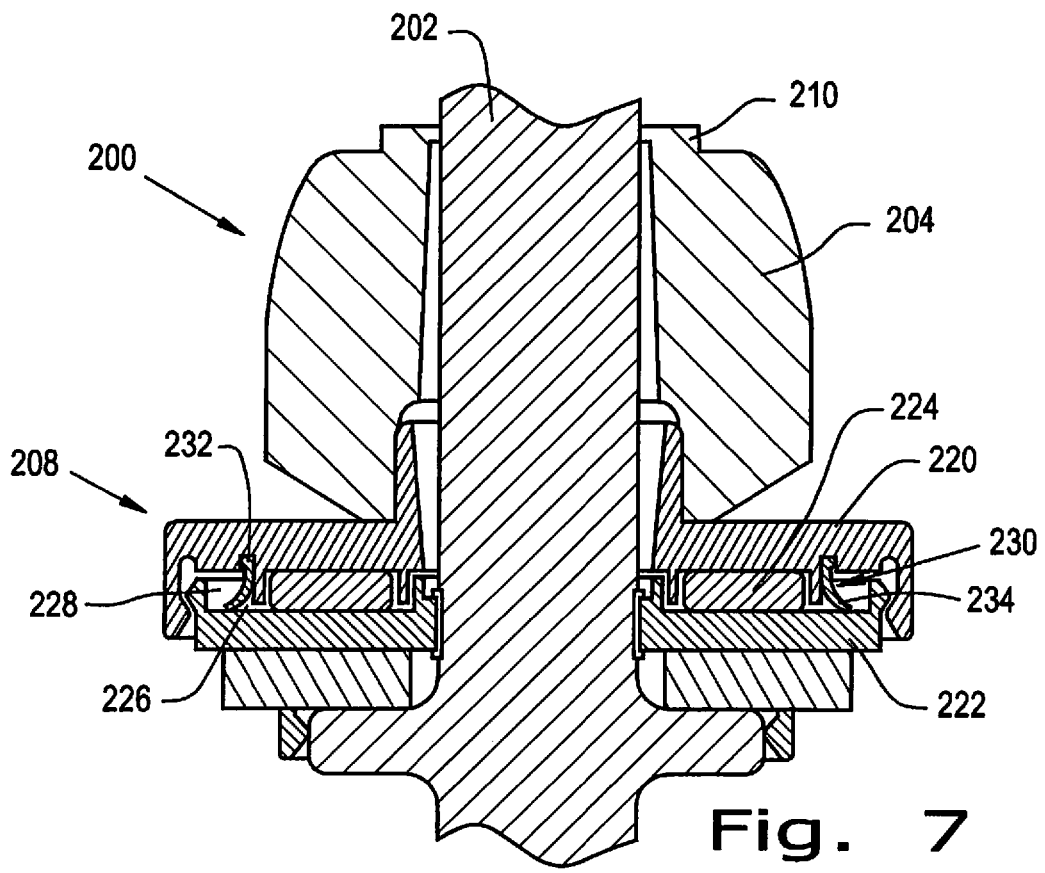
FIG. 7 is a is a cross-sectional view of the fully assembled end link shown in FIG. 6.
Figure 6:
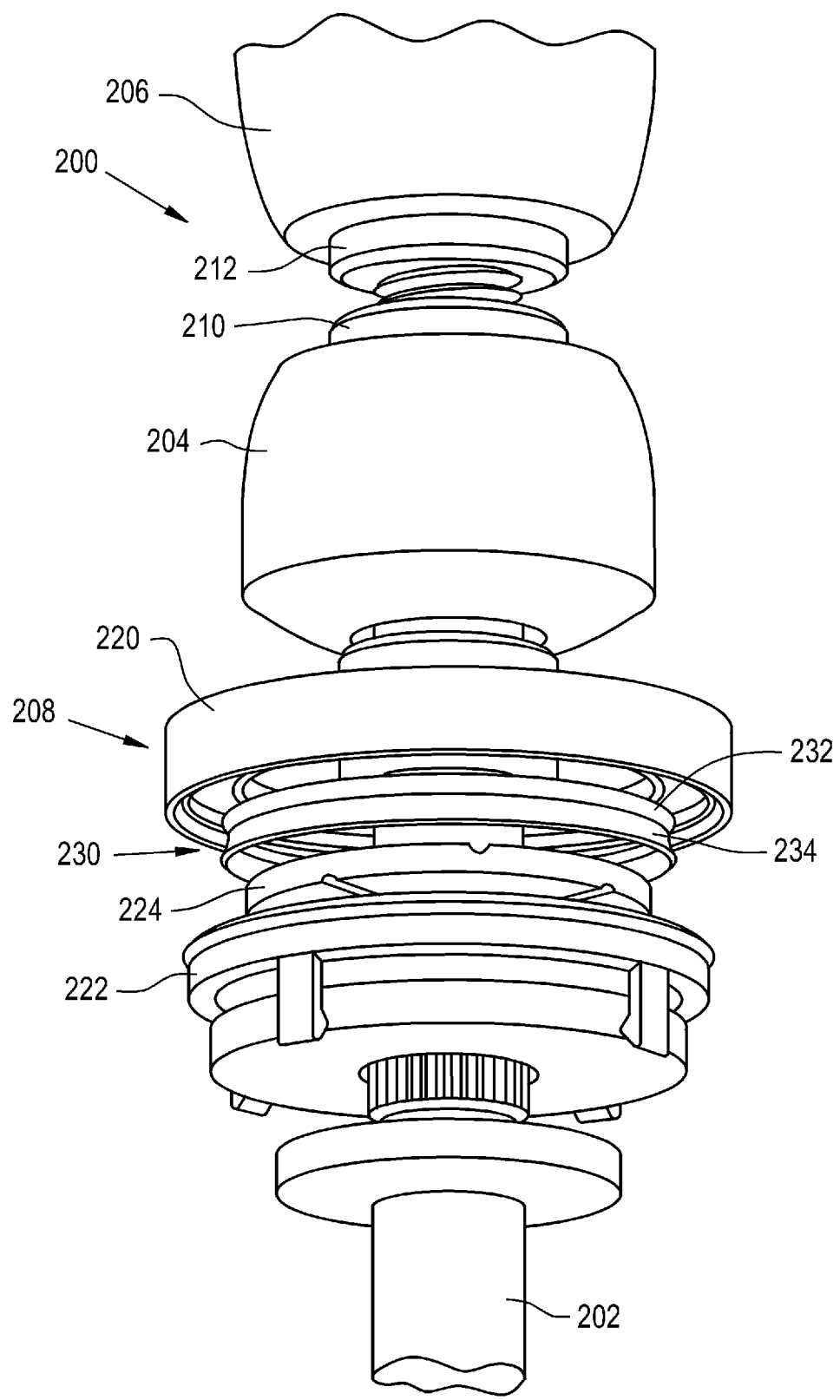
FIG. 6 is a perspective, exploded view of an end link having an end link seal of a second embodiment.
Figure 8:
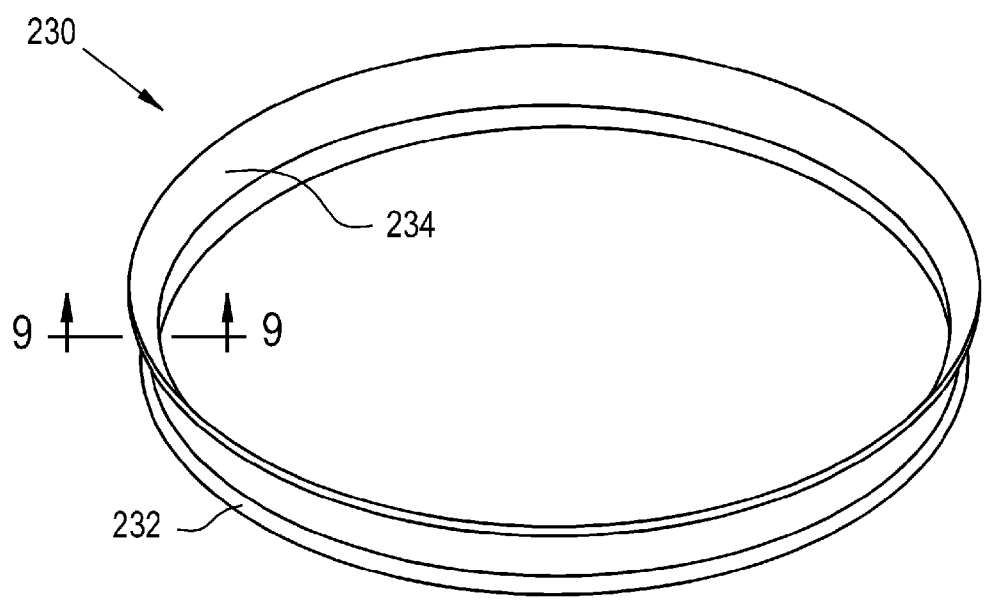
FIG. 8 is a perspective view of the seal shown in FIGS. 6 & 7.
Figure 9:
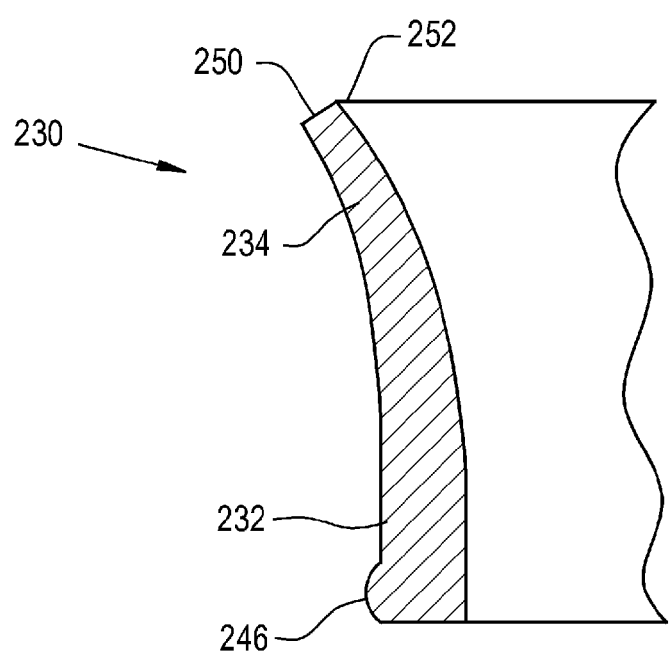
FIG. 9 is an enlarged cross-sectional view of the seal shown in FIG. 8, taken along line 9-9 of FIGS. 8.
Figure 10:
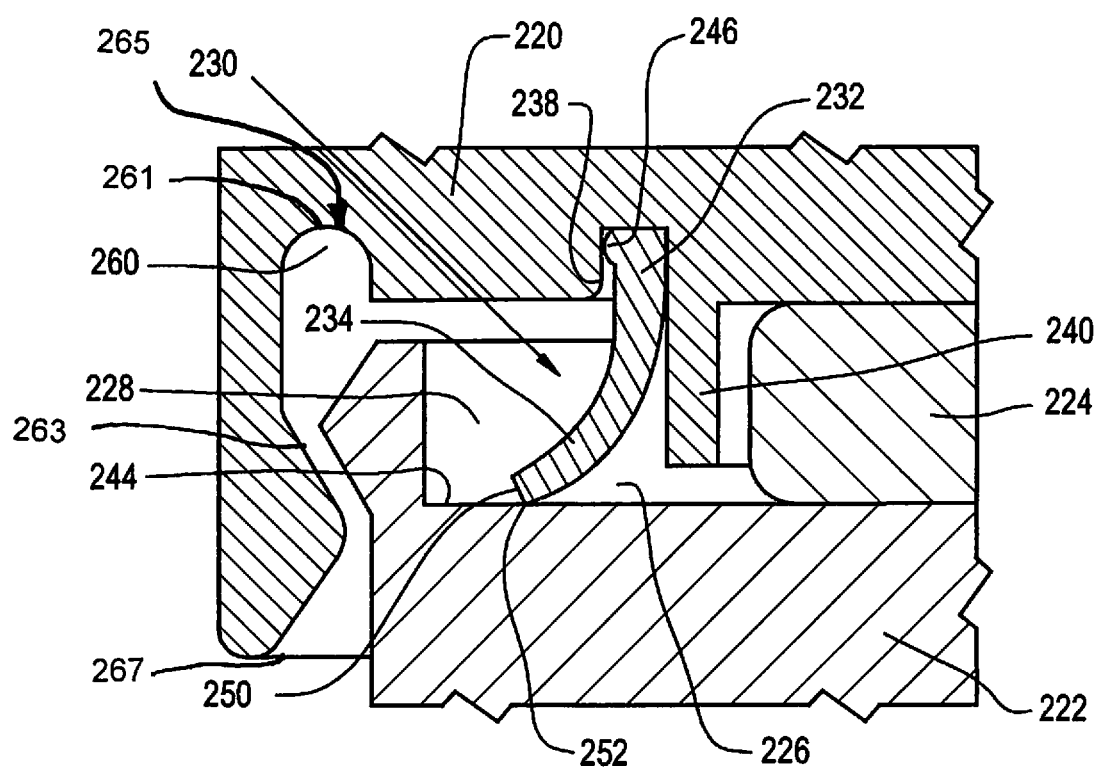
FIG. 10 is an enlarged, fragmentary cross-sectional view of the installed seal shown in FIGS. 6-10.

FIGS. 5 & 10 illustrate further modifications for improved performance. Larger outer bearing volumes 128, 228 discourage contaminants from abrading seals 130, 230 by providing increased volume for containing contaminants away from seals 130, 230 even after contaminants reach the general areas of seals 130, 230. Catch troughs 160, 260 are provided for capturing and accumulating debris in areas more remote from seals 130, 230. Either of the lip seals 130 or 230 rides on a horizontal face of the opposite bearing component to maintain a sealing relationship even if horizontal or side shift occurs. The catch troughs 160, 260 include curved surfaces 161, 261 connected to canted passages 163, 263. As shown, the catch troughs 161, 261 are radially outward from the seals 130, 230. The curved surfaces 161, 261 are at closed-ended areas 165, 265 of the bearing races 120, 220. The closed-ended areas 165, 265 are distally located from openings 167, 267 connected to the canted passages 163, 263.

The placement of lip seals 130, 230 in the bottoms of wells 138, 238 provides a degree of assembly proofing. If a seal 130, 230 is not properly seated in the bottom of well 138, 238 the distal edge of the seal will be too high and may be visibly notable to the assembler while perhaps further inhibiting completed assembly of the component parts.

Advantages of the seals disclosed herein include lower compression force and reduced friction, which improve wear and performance characteristics. The wiper orientation prevents pressurization in the bearing cavity in that it yields readily if grease is pushed from the bearing assembly. However, the angular orientation establishes a firm physical barrier to the ingress of contaminants. The wiper seal designs illustrated herein provide lower bearing torque then known O-ring designs requiring pre-loading. Further, the seal is maintained even during horizontal shift of the bearing assembly. Manufacturing and installation are simplified.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A bearing for an end link of a vehicle suspension system, comprising:
   a first bearing race defining a well;
   a second bearing race having a bearing race surface, one of the first bearing race and the second bearing race defining a catch trough for capturing and retaining contaminants, wherein the catch trough includes a curved surface connected to a canted passage, wherein the catch trough is radially outward from the wiper seal, and wherein the curved surface is at a closed-ended area of the first or second bearing race that is distally located from an opening connected to the canted passage;
   a wiper seal having a main body disposed in the well and supported radially inwardly, and a tail extending angularly radially outwardly from the main body and engaged against the bearing race surface.

2. The bearing of claim 1, the main body being block-like in cross-section, and the tail extending from a radially inner edge area of the main body.

3. The bearing of claim 1, the tail including an angular distal end surface defining a wiper edge slidingly engaged against the bearing race surface.

4. A bearing in an end link of a vehicle suspension system, the bearing comprising:
   a first bearing race, wherein the first bearing race defines a catch trough for capturing and retaining contaminants, wherein the catch trough includes a curved surface connected to a canted passage, wherein the catch trough is radially outward from the wiper seal, and wherein the curved surface is at a closed-ended area of the first bearing race that is distally located from an opening connected to the canted passage;
   a second bearing race; and
   a wiper seal comprising:
      a main body secured to the first bearing race; and
      a flexible tail thinner than the main body slidingly engaged against the second bearing race, the tail extending angularly radially and axially from the main body.

5. The bearing of claim 4, the main body disposed in a well in the first bearing race.

6. The bearing of claim 4, the main body supported radially inwardly by the first bearing race.

7. The bearing of claim 6, the main body being block-like in cross-section.

8. The bearing of claim 7, the tail extending angularly radially and axially from a radial inner edge area of said main body.

9. A vehicle suspension system, comprising:
   a link rod;
   an end link secured to the link rod, wherein the end link includes at least one grommet; and
   at least one bearing assembly connected to the at least one grommet, the at least one bearing assembly including a bearing seal comprising:
      a first bearing race;
      a second bearing race, one of the first and second bearing races defining a catch trough for accumulating debris therein, wherein the catch trough includes a curved surface connected to a canted passage, wherein the catch trough is radially outward from the wiper seal, and wherein the curved surface is at a closed-ended area of the first or second bearing race that is distally located from an opening connected to the canted passage;
      a wiper seal secured to one of said first and second bearing races and slidingly engaged against the other of the first and second races; and
      the wiper seal including a main body secured to one of the first and second bearing races, and a flexible tail thinner than the main body slidingly engaged against the other of the first and second bearing races.

10. The vehicle suspension system of claim 9, the main body disposed in a well in one of the first and second bearing races, the main body supported radially inwardly by one of the first and second bearing races.

11. The vehicle suspension system of claim 9, the main body being block-shaped in cross-section.

12. The vehicle suspension system of claim 11, the tail extending angularly radially and axially from a radial inner edge area of the main body.

13. The vehicle suspension system of claim 9, the main body supported radially inwardly by one of the first and second bearing races.

14. The vehicle suspension system of claim 9, the tail extending angularly radially and axially from the main body.

15. The vehicle suspension system of claim 9, the tail including an angular distal end surface defining a wiper edge slidingly engaged against a bearing race surface of the other of the first and second hearing races.

16. The vehicle suspension system of claim 15, the tail extending angularly radially and axially from the main body.

* * * * *